July 11, 1939.  A. ROSENTHAL  2,165,654
ARTICLE HOLDER FOR COOKING UTENSIL COVERS
Filed June 10, 1937
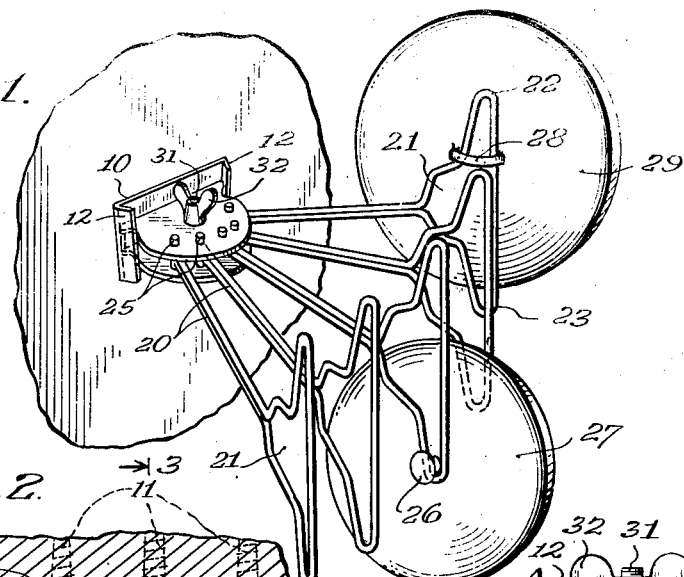
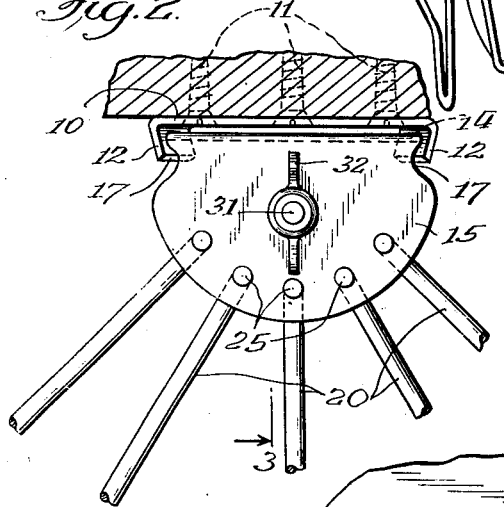
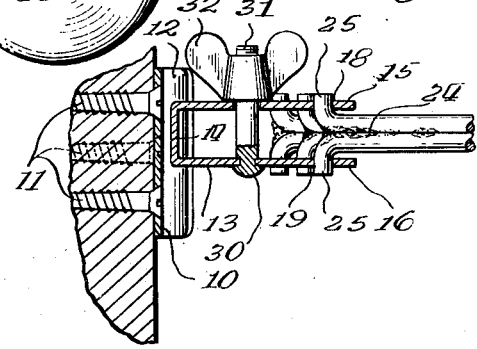
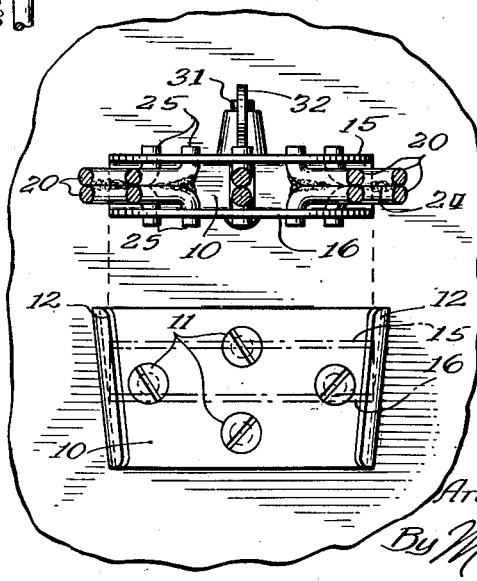
Inventor
Arthur Rosenthal
By Maurice S. Cayne
Atty.

Patented July 11, 1939

2,165,654

UNITED STATES PATENT OFFICE 2,165,654

ARTICLE HOLDER FOR COOKING UTENSIL COVERS

Arthur Rosenthal, Chicago, Ill.

Application June 10, 1937, Serial No. 147,435

3 Claims. (Cl. 211—41)

This invention relates generally to a bracket having a plurality of hangers for retaining various articles and more particularly to a device of this character adapted for individually supporting a certain class of articles, such for example as the covers of cooking utensils in accessible position on a wall or the like, whereby one or more of said covers may be readily withdrawn or removed from its respective hanger without disturbing the other covers or hangers.

It is well known that at the present time, substantially all covers used for cooking utensils are provided with either one of two types of handles. These two types are the knob handle and the ring or loop handle. It is, therefore, another object of this invention to produce a hanger of the character described for individually supporting a cover of a cooking utensil, which hanger is so constructed as to permit the disposition thereon, and to be supported thereby, of a cover having either of the above types of handles, and when so positioned, the cover will be held snug against the hanger and will be maintained in place when the hanger is jarred or is moved when adjacent covers are being withdrawn or removed from adjacent hangers.

A further object of the invention is to provide a device of the character described which will maintain and support in operative position covers of cooking utensils of different sizes, and which will occupy a minimum of space when attached to a wall or the like in operative position, and which will also be capable of being moved to a substantially collapsed position to facilitate the storing and shipping of the same.

A still further object of this invention is to provide in a device of the character described, means for detachably securing the same to a wall or the like, and being provided with a plurality of hangers, each adapted for swinging movement in a horizontal plane, and each hanger having means for supporting thereon a cover of a cooking utensil having either a knob handle or a ring or loop handle, and means also associated with said device for fixedly securing said hangers to any position to which they may be swung.

A still further object of this invention is to provide a device of the character described which will be simple in construction, assembly and operation, which may be constructed along lines convenient for low cost manufacture, and which will, at the same time, be highly efficient for carrying out the purpose for which it is designed.

With the foregoing and other objects in view, which will appear as the description proceeds, the invention consists in certain novel features of construction, arrangement and combination of parts hereinafter more fully described, illustrated in the accompanying drawing, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawing preferred embodiments thereof, from an inspection of which, when considered in connection with the following description, my invention, its mode of construction, assembly and operation, and many of its advantages should be readily understood and appreciated.

Referring to the drawing in which the same characters of reference are employed to indicate corresponding or similar parts throughout the several figures of the drawing:

Fig. 1 is a view in perspective of a bracket and a plurality of hangers secured in operative position thereto, embodying my invention;

Fig. 2 is a top plan view of the same;

Fig. 3 is a sectional view taken substantially on line 3—3 of Fig. 2;

Fig. 4 is a front elevational view of the same with the hangers being shown in section and the bracket removed from its base.

Referring to the drawing more specifically by characters of reference, the numeral 10 designates a base formed of any suitable material such as metal or the like, and provided with a plurality of screw holes by means of which and the screws 11, the said base may be readily and detachably secured in place on any suitable flat surface such as a wall or the like. The base 10 is provided with forwardly and inwardly extending flanges 12 at the side edges thereof, between which flanges is adapted to be received a substantially U-shaped bracket 13, and to be held by said flanges in assembled position with the base 10.

As shown more clearly in Fig. 4, this base formed between the flanges 12 is somewhat larger at its upper end and gradually diminishing in size downwardly so as to permit the bracket 13 to wedge itself into place within the base 10 to be securely held therein, although permitting quick removal of the said bracket whenever it is found necessary or desirable to remove the same for cleaning or other purposes.

The bracket 13 may be formed of suitable material such as spring sheet metal or the like, and is provided with a rear wall 14 and the substantially parallel top and bottom plate portions 15 and 16, each of said plate portions being of substantially arcuate formation and having a notch 17 formed adjacent its juncture with the rear wall 14 for cooperating with the flanges 12 of the base to complete the assembly of said bracket and base.

Each of said plate portions 15 and 16 is provided adjacent its outer periphery with an arcuate row of openings 18 and 19 respectively, the openings in one plate portion being arranged directly opposite the openings in the other of said plate portions, said openings being adapted to receive therein the hangers or arms 20 and to support the same for swinging movement in a horizontal plane within the bracket 13.

Each of the hangers 20 is of identical construction and is formed from suitable material, such as a single piece of wire or the like bent upon itself to produce substantially the shape shown in Fig. 1 of the drawing. Each of said arms is provided at its forward end with a loop 21 having substantially V-shaped upper and lower extensions 22 and 23, which extensions lie in substantially the same vertical plane and in the same vertical plane with the body of the hanger or arm 20, said body being formed by bringing the end portions of the single piece of wire from which the said hangers are formed into substantial engagement with each other, as shown in Fig. 3, in which position said portions may be rigidly and permanently secured to each other in any suitable manner, such as by soldering or the like as shown at 24 in Fig. 3, with the free ends of said wire being turned outwardly to produce the portions 25, which portions are adapted to be received within the openings 18 and 19 of said plate portions 15 and 16. When so assembled the said arms will be pivotally mounted for swinging movement in a horizontal plane within the bracket 13.

The forward loop portions 21 of each of said arms is adapted for supporting thereon various articles, and particularly covers of cooking utensils. These covers are usually provided with either a knob handle, as shown at 26 in Fig. 1 on the cover 27, or a loop handle 28 as shown on the cover 29. When it is desired to support a cover having a knob handle, the neck portion of the knob will be held as shown in Fig. 1 in the bottom V-shaped extension 23, and when in such position it will be noted that the upper portion of the cover will lie against the body of the loop 21, and the entire cover will be held snugly within said loop so that any jarring or movement of the arm within which the cover is supported will not dislodge the cover from its support. When it is desired to support a cover on these hangers of the type shown at 29 having the loop handle 28, the said handle is slipped over the upper extension 22 of the hanger as shown in Fig. 1, in which position it will be noted that the body of the cover will lie against the loop 21 of the hanger on which it is supported, and will remain in place thereon even though the said hanger may be jarred or moved.

It will also be noted that both types of covers, that is the one shown at 27 with the knob handle and the one shown at 29 with the loop handle will, when in a supported position on the said hangers, lie in a substantially vertical plane, thus occupying only a minimum of space and permitting the withdrawal or removal from its respective hanger with the minimum of effort, and with no disturbance whatsoever to the other hangers or covers supported thereby.

In order to assure against the arms 20 becoming disassociated from the bracket 13 and also for permitting said arms to be held in any position to which they may be moved, I have provided the bolt 30 which is secured to the lower plate portion 16 of the bracket 13, said bolt extending through an opening provided in the upper plate portion 15, and has its free end threaded as shown at 31, upon which free end is received a wing nut 32, the actuation of which will bring said plate portions 15 and 16 in clamping engagement upon the arms 20, and thereby hold the same in any position to which they may be moved.

From the above it will be noted that I have provided a device adapted for supporting various articles, but which is particularly suitable for supporting covers of cooking utensils, said device being capable of supporting covers having different types of handles as well as covers of different sizes. It will further be noted that said device is capable of detachable connection to a wall or the like, whereby the same may be readily removed for cleaning or other purposes. Said device is also capable of being moved to a substantially collapsed condition thus facilitating the storage and shipping of the same, and when in assembled position on the wall or the like, will occupy only a minimum of space and will permit ready access to each of the covers supported thereon, thus permitting a single cover to be withdrawn or removed without in any way disturbing the other covers.

It is believed that my invention, its mode of construction and assembly, and many of its advantages should be readily understood from the foregoing without further description, and it should also be manifest that while preferred embodiments of the invention have been shown and described for illustrative purposes, the structural details are nevertheless capable of wide variation within the purview of my invention as defined in the appended claims.

I claim:

1. In a device of the character described, the combination of a base and a plurality of arms swingably supported thereby for movement in a horizontal plane, each of said arms being of a single piece of wire bent upon itself and arranged to form a loop at its forward end, said loop arranged in a substantially vertical plane and having an enlarged opening at its central portion and gradually tapering towards both ends, whereby said upper portion of said loop will be adapted for supporting an article having a ring handle and said lower portion being arranged to receive a knob affixed to an article to be supported in said loop and to thereby support the article through engagement with said knob, and means carried by said base for holding said arms in any position to which they may be moved.

2. In a device of the character described, the combination of a base and a bracket of substantially U-shaped formation detachably secured in operative position on said base, said bracket including a pair of substantially parallel arcuate shaped plate portions, and being provided adjacent their outer peripheries with a plurality of openings, a plurality of arms pivotally mounted within said openings for swinging movement in a horizontal plane, each of said arms being provided at their forward ends with a loop arranged in a substantially vertical plane and having an enlarged opening at its central portion and gradually tapering towards both ends, whereby said upper portion of said loop will be adapted for supporting an article having a ring handle and said lower portion being arranged to receive a knob affixed to an article to be supported in said loop and to thereby support the article through engagement with said knob.

3. In a device of the character described, the combination of a base and a bracket of substantially U-shaped formation detachably secured in operative position on said base, said bracket including a pair of substantially parallel arcuate shaped plate portions, and being provided adjacent their outer peripheries with a plurality of openings, a plurality of arms pivotally mounted within said openings for swinging movement in a horizontal plane, each of said arms being provided at their forward ends with a loop arranged in a substantially vertical plane and having an enlarged opening at its central portion and gradually tapering towards both ends, whereby said upper portion of said loop will be adapted for supporting an article having a ring handle and said lower portion being arranged to receive a knob affixed to an article to be supported in said loop and to thereby support the article through engagement with said knob, and means provided on said plate portions for securely holding said arms in any position to which they may be moved.

ARTHUR ROSENTHAL.